June 11, 1946. W. C. STARKEY Re. 22,767

REVERSING CLUTCH CONSTRUCTION

Original Filed Nov. 4, 1939

INVENTOR.
WILLIAM CARLETON STARKEY.
BY Lockwood, Goldsmith & Galt,
ATTORNEYS.

Reissued June 11, 1946 Re. 22,767

UNITED STATES PATENT OFFICE 22,767

REVERSING CLUTCH CONSTRUCTION

William Carleton Starkey, Indianapolis, Ind., assignor, by mesne assignments, to Fletcher Trust Company, Indianapolis, Ind., a corporation of Indiana, as trustee Original No. 2,235,266, dated March 18, 1941, Serial No. 302,821, November 4, 1939. Application for reissue March 13, 1946, Serial No. 654,125

6 Claims. (Cl. 192—51)

This invention relates to a reversing clutch construction and more particularly to that type of reversing mechanism in which a clutching action is secured by expanding or contracting a helically coiled spring into clutching engagement with a mating clutch surface, the frictional action of which tends to increase the tendency to expand or contract and thus increases the frictional force available for transmission of power.

One object of the invention is to provide a simple, reliable construction of this type which may be housed in a relatively small space.

Another object of the invention is to provide a device which may be adapted for transmission of power in either direction with very small changes in construction.

Another object of the invention is generally to improve reversing ocnstructions of this type.

Other objects and features of the invention will be understood from the accompanying drawing and the following description and claims:

Figure 1:
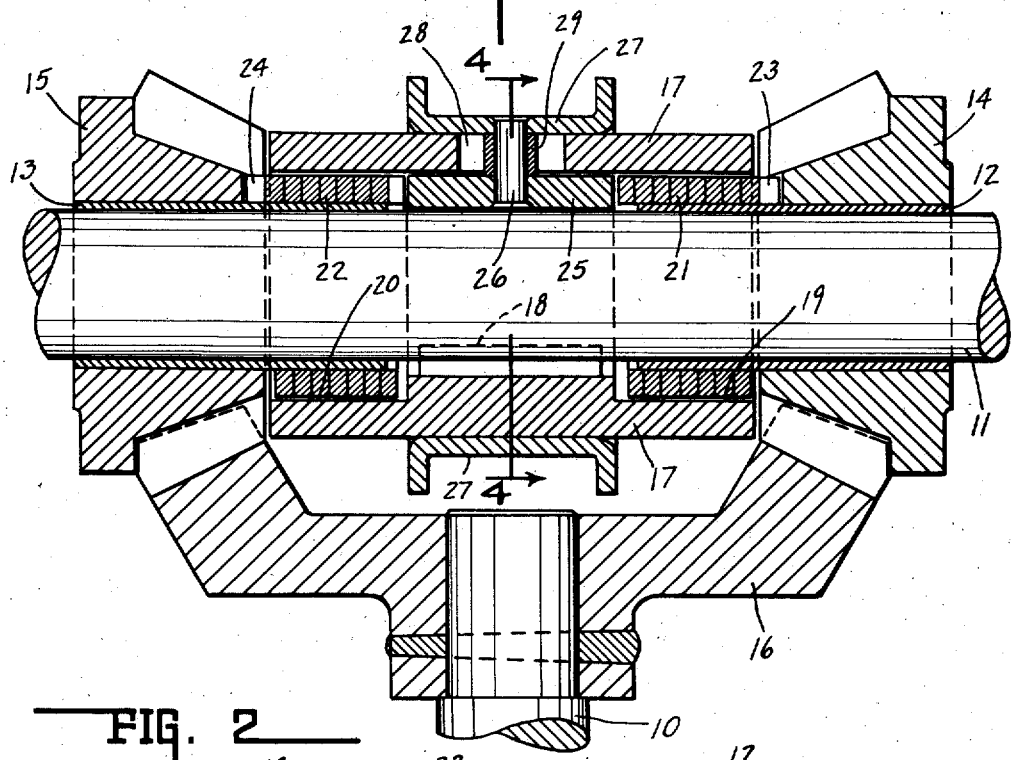
Fig. 1 is a central sectional view through a reversing clutch construction built in accordance with the invention.

In the preferred form of the invention shown in the drawing by way of illustration, there are provided a pair of shafts 10 and 11, either of which may be considered a drive shaft and the other a driven shaft. The shaft 11 has freely mounted thereon a pair of bushings 12 and 13 carrying bevel pinions 14 and 15, respectively. Preferably the bushings are pressed into the pinions and rotate therewith. The gears 14 and 15 may be restrained against axial movement by suitable thrust collars or bearings not shown in the drawing. A bevel gear 16 is secured to the shaft 10 and engages the pinions 14 and 15. When shaft 10 is the drive shaft, the pinions are obviously rotated in opposite directions. When shaft 10 is the driven shaft, it may be driven in opposite directions by similar rotations of the two pinions.

A clutch member 17 is secured to the shaft 11 by a key 18 and its outer ends are provided with spring pockets having internal clutch surfaces 19 and 20 concentric with shaft 11. A pair of helical clutch springs 21 and 22 are seated in the spring pockets and are provided with external clutch surface adapted to mate respectively with the clutch surfaces 19 and 20 but are normally slightly spaced therefrom. The springs 21 and 22 are provided with outwardly extending toes 23 and 24 engaged in suitable recesses in the pinions 14 and 15, respectively. By this means each of said springs is anchored to one of said pinions in such manner that it may transmit torque either to or from the same.

An actuator key 25 is slidably mounted in a suitable keyway in the clutch member 17 and is secured, as by a rivet 26, to a clutch collar 27 slidably mounted on the external surface of the clutch member 17. The rivet 26 operates in a suitable slotted opening 28 in the clutch member 27 and is surrounded by a spacer bushing 29 adapted to hold the collar 27 and key 25 in proper spaced relation.

Figure 2:
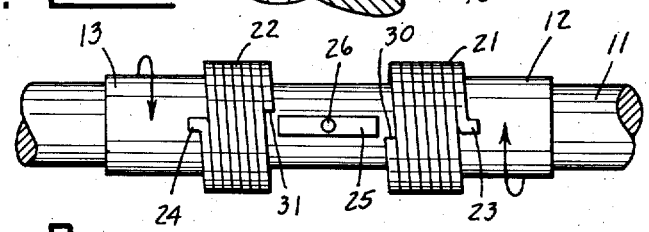
Fig. 2 is a plan view of certain of the elements thereof with other parts removed.

When the shaft 10 is to be used as the drive shaft and shaft 11 as the driven shaft, the springs 21 and 22 are similarly wound as shown in Fig. 2. In this figure it is assumed that the direction of rotation of shaft 10 is such as to rotate the springs in the direction of the arrows in that figure. If the rotation of shaft 10 is to be in the opposite direction, the two springs will both be wound in the opposite direction but will still be similarly wound with respect to each other. With this type of construction and with the mechanism in the neutral position shown in the drawing, the springs 21 and 22 rotate freely in opposite directions within their respective spring pockets. Shaft 11 and clutch member 17 are stationary. When it is desired to drive shaft 11 in the direction of rotation of gear 14, the collar 27 is shifted to the right by any suitable form of shifting fork. The key 25 then engages the free end 30 of the rotating spring 21 and the force exerted on said spring by said engagement expands the same into engagement with the inner face 19 of the spring pocket. The frictional force exerted by the surface of said spring pocket tends still further to expand the spring and to clutch the same securely to the clutch member 17. Power is thus transmitted from the shaft 10 through gear 16, gear 14, spring 21 and clutch member 17 to the shaft 11 and said shaft rotates in the direction of rotation of gear 14.

Similarly, when it is desired to drive shaft 11 in the opposite direction, the collar 27 is shifted to the left to bring the key 25 into contact with the free inner end 31 of spring 22. Said spring is similarly expanded to drive shaft 11 in the direction of rotation of gear 15.

Figure 3:
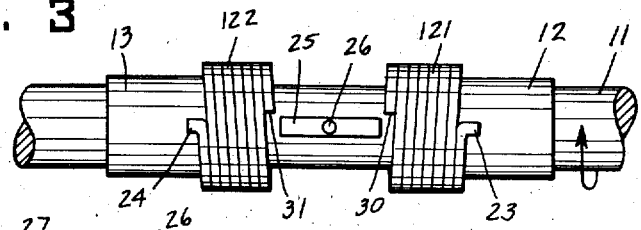
Fig. 3 is a similar view with parts arranged for a reversal of function between the driving and driven elements.
Figure 4:
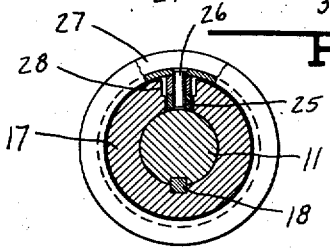
Fig. 4 is a sectional view on the line 4—4 of Fig. 1.

When it is desired that shaft 11 be the drive shaft and shaft 10 the driven shaft, the springs are wound in opposite directions with respect to each other as shown by springs 121 and 122 in Fig. 3. In this figure it is assumed that the direction of rotation of shaft 11 is in accordance with the arrow. If the direction of this rotation is to be the opposite, the two springs 121 and 122 are wound in the opposite directions from those shown in the drawing. In the operation of this construction, the gears 14 and 15 and the two springs remain stationary when the parts are in the neutral position shown in Fig. 1. The shaft 11, clutch member 17 and key 25 rotate in the direction of the arrow. When it is desired to run shaft 10 in one direction, the key 25 is shifted to the right to engage the free end 30 of spring 121. Said spring is expanded as before to clutch the member 17 and to transmit torque from shaft 11 through gears 14 and 16 to shaft 10. When the key 25 is moved in the opposite direction to engage the free end 31 of the spring 122, said spring is similarly actuated and the shaft then is driven through gear 15 and the direction of its rotation is reversed.

The reversing clutch construction just described provides a simple and efficient mechanism for the purpose. It may be housed in a relatively small space and has few working parts subject to frictional wear. The details may be varied from the preferred forms shown herein without departing from the scope of the invention as defined by the appended claims.

The invention claimed is:

1. In a reversing clutch construction, a shaft, a pair of members freely journaled on said shaft and mechanically connected to rotate in opposite directions, a clutch pocket element secured to said shaft between said members and having its outer ends formed as clutch pockets with internal clutch surfaces, a pair of helical clutch springs each having one end anchored to one of said members and having a free end extending into one of said clutch pockets, an actuator key slidably mounted in said clutch pocket element and movable in one direction to engage one of said springs and in the opposite direction to engage the other of said springs for expanding the same into clutching engagement with said clutch surfaces, a clutch collar slidably mounted on the outer surface of said clutch pocket member and a connection between said clutch collar and said actuator key for moving said key to engage said springs.

2. In a reversing clutch construction, a pair of coaxially rotatable members mechanically connected to rotate in opposite directions, a central clutch member interposed between said members and coaxially rotatable therewith, said central member having clutch surfaces formed on the opposite ends thereof concentric with the axis of rotation, a pair of helical clutch springs each having a clutch surface adapted to mate with one of said first mentioned clutch surfaces and each having its outer end anchored to one of said pair of rotatable members, an actuator constrained to rotate with said central clutch member but movable axially in one direction to actuate one of said clutch springs into clutching engagement with said central member and in the opposite direction to similarly actuate the other of said clutch springs, a clutch collar slidably mounted on the outer surface of said central clutch member and a connection between said clutch collar and said actuator for moving said actuator to engage said clutch springs.

3. In a reversing clutch construction, a drive shaft, a driven shaft, a pair of rotatable members freely journaled on said driven shaft, gear connections between said drive shaft and said rotatable members adapted to rotate said members in opposite directions, a clutch member secured to said driven shaft and interposed between said pair of rotatable members, said clutch member having spring pockets formed on its opposite ends, a pair of similarly wound helical clutch springs each anchored to one of said pairs of rotatable members, and each normally rotating freely in one of said pockets, an actuator key slidably mounted on said clutch member, and means for sliding said key in one direction to engage the free end of one of said rotating clutch springs to expand the same into clutching engagement with the inner face of its associated spring pocket and for sliding said key in the opposite direction similarly to engage and expand the other of said springs.

4. In a reversing clutch construction, a drive shaft, a driven shaft, a pair of rotatable members freely journaled on said drive shaft, gear connections between said driven shaft and said rotatable members by means of which said driven shaft is rotated in one direction by rotation of one of said members and in the opposite direction by similar rotation of the other of said members, a clutch member secured to said drive shaft and interposed between said pair of rotatable members, said clutch member having spring pockets formed on its opposite ends, a pair of oppositely wound helical clutch springs each anchored to one of said pairs of rotatable members and each normally extending freely into one of said spring pockets, an actuator key constrained to rotate with said clutch member but movable axially thereof, and a clutch collar slidably mounted on the exterior surface of said clutch member and connected to said key for moving said key in one direction to engage the free end of one of said springs to expand the same into clutching engagement with the inner face of its associated spring pocket and in the opposite direction similarly to engage and expand the other of said springs.

5. In a reversing clutch construction, a drive shaft, a driven shaft, a pair of rotatable members freely journaled on said driven shaft, gear connections between said drive shaft and said rotatable members adapted to rotate said members in opposite directions, a clutch member interposed between said rotatable members and adapted when rotated to rotate said driven shaft, said clutch member having clutch surfaces formed thereon concentric with said driven shaft, a pair of similarly wound helical clutch springs each anchored to one of said rotatable members and each having a clutch surface adapted to mate with one of said first mentioned clutch surfaces but normally spaced therefrom, an actuator slidably mounted for axial movement on said clutch member, and means for moving said acuator in one direction to actuate one of said springs into clutching engagement with its associated clutch surface and in the opposite direction similarly to actuate the other of said springs.

6. In a reversing clutch construction, a drive shaft, a driven shaft, a pair of rotatable members freely journaled on said drive shaft, gear connections between said driven shaft and said rotatable members by means of which said driven shaft is rotated in one direction by rotation of one of said members and in the opposite direction by similar rotation of the other of said members, a clutch member rotated by said drive shaft and interposed between said rotatable members, said clutch member having clutch surfaces formed thereon concentric with said drive shaft, a pair of oppositely wound helical clutch springs each anchored to one of said rotatable members and each having a clutch surface adapted to mate with one of asid first mentioned clutch surfaces but normally spaced therefrom, an actuator slidably mounted for axial movement on said clutch member but constrained to rotate therewith, and a clutch collar slidably mounted on the exterior surface of said clutch member and connected to said actuator for moving said actuator in one direction to actuate one of said springs into clutching engagement with its associated clutch surface and in the opposite direction similarly to actuate the other of said springs.

WILLIAM CARLETON STARKEY.